Figure 1:
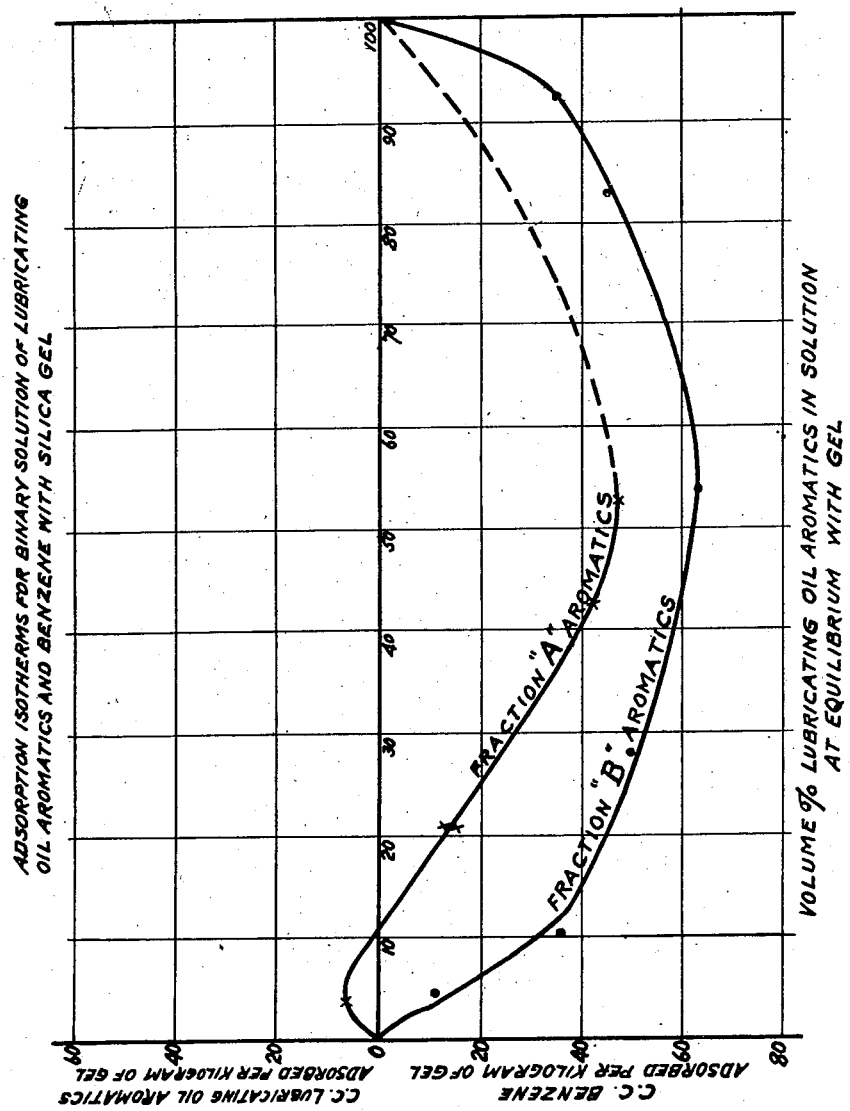

| CURVE No. | PRIMARY SOLVENT | SECONDARY SOLVENT |
|---|---|---|
| 1 | BENZENE | N-HEPTANE |
| 2 | ETHYLENE DICHLORIDE | " |
| 3 | ETHYL ETHER | METHYLCYCLOHEXANE |
| 4 | ACETONE | " |
| 5 | METHYL ALCOHOL | " |

FIG. 3-A

FIG. 3-B

INVENTORS
Alfred E. Hirschler &
Moses R. Lipkin
BY
Busser and Harding
ATTORNEYS.

WITNESS:
Rob't P. Kitchel.

Patented May 18, 1948

2,441,572

UNITED STATES PATENT OFFICE 2,441,572

CYCLIC PROCESS FOR SEPARATING AROMATIC HYDROCARBONS FROM A MIXTURE OF HYDROCARBONS

Alfred E. Hirschler, Drexel Hill, and Moses Robert Lipkin, Philadelphia, Pa., assignors to Sun Oil Company, Philadelphia, Pa., a corporation of New Jersey Application July 18, 1944, Serial No. 545,446

14 Claims. (Cl. 196—147)

This invention relates to the separation of hydrocarbons according to chemical type by selective adsorption and particularly concerns the separation of aromatics from other hydrocarbons. More particularly, the invention is directed to a process wherein aromatic constituents of hydrocarbon mixtures boiling within the range of gas oil and lubricating oil are removed by adsorption on a granular adsorbent material, and the adsorbed aromatics are recovered and the adsorbent material regenerated for further use by means of liquid desorbing agents.

The invention has particular utility in the preparation of substantially aromatic-free oils such as the so-called "white oils" or in the production of moderately refined oils having reduced aromatic content, for example, electrical oils and motor oils. The invention also is useful in the preparation of highly aromatic products of high molecular weight. In its general applicability, it provides a means of separating hydrocarbon mixtures derived from petroleum, coal, lignite, shale oil, pitches, tars or like sources and which boil mainly above about 500° F. into relatively non-aromatic and aromatic fractions.

It is known that a complex hydrocarbon mixture such as gas oil or lubricating oil may be separated to an extent according to chemical type by selective adsorption on certain granular adsorbent materials and it is well recognized that silica gel is one of the most efficient adsorbents for this purpose. It has been generally recognized that the adsorptive affinity of silica gel and like adsorbents varies with the chemical type of compound in accordance with the following decreasing order of adsorbability:

(1) Water.
(2) Organic polar substances such as alcohols, phenols, ethers and the corresponding sulfur and nitrogen compounds.
(3) Aromatics.
(4) Olefins.
(5) Naphthenes.
(6) Paraffins.

Thus, of the main hydrocarbon types comprising gas oil or lubricating oil fractions, aromatics are the most readily adsorbed by silica gel and methods of effecting the removal of aromatics by means of silica gel are known to the art. In general these methods comprise contacting the hydrocarbon charge with silica gel by percolation filtration to adsorb aromatics, and following this with a desorption step wherein the gel is contacted with a polar material which is very strongly adsorbed, for instance with water, methanol or acetone, and which serves to replace the aromatics on the gel. The aromatic hydrocarbons thereby are removed from the gel in admixture with excess desorbing agent, from which they may be recovered by distillation, extraction, decantation or the like.

These known methods for removing aromatics have proved to be impractical for large scale operation due to certain inherent disadvantages, and consequently have been used only as an analytical tool. One major disadvantage in such methods is that the gel, after desorption of the aromatics by contact with a polar desorbing agent, is in an inactivated state due to the presence of adsorbed polar agent, and therefore must be reactivated by removal of the polar agent before it can be reused for further adsorption of aromatics. Reactivation may be accomplished by steaming the gel and then blowing it with air at a relatively high temperature, but such procedure has not proved practical for commercial operation due to the unreasonable length of time involved in heating a commercial quantity of gel to the temperature required for reactivation and in subsequently cooling it before reuse. Furthermore, the gel when revivified in this manner is left in a dry condition, so that when it is further contacted with hydrocarbon charge material considerable heat is liberated as heat-of-wetting. This again presents the problem of heat transfer in each cycle of operation.

In the copending application, Serial No. 501,280, filed September 4, 1943, by one of the present inventors, Moses Robert Lipkin, and which has issued as Patent No. 2,398,101, April 9, 1946, there is disclosed and claimed a commercially feasible process for removing aromatics by adsorption on silica gel or adsorbents conforming substantially to silica gel in adsorptive properties. In this process removal of the adsorbed aromatics from the gel and reactivation of the gel for further use are effected in one step by contacting the used adsorbent with a desorbing agent which is less strongly adsorbed, rather than more strongly adsorbed, than the aromatics. The desorbing agent is a hydrocarbon or mixture of hydrocarbons selected from the chemical classes listed hereinabove as having lower adsorbability on silica gel than aromatics, viz. paraffins, naphthenes and olefins, and suitably may be a low boiling aliphatic hydrocarbon such as propane, butane and pentane or petroleum ether. This process thus permits revivification of the silica gel without heating and substantially eliminates heat-of-wetting effects.

The process disclosed in the aforesaid application is not, however, generally suitable for the treatment of hydrocarbon fractions which boil above the kerosene range, such as gas oil or lubricating oil. It has been found that aromatic hydrocarbons present in such higher boiling fractions are, to large extent, sufficiently strongly adsorbed by silica gel so that inordinately large amounts of the specified desorbing agents are required to effect substantial desorption. Presumably this is due to a larger number of aromatic rings per molecule and the presence of more condensed rings than in the aromatics of gasoline or kerosene boiling range. However, we have now devised a method of removing these higher boiling aromatics substantially completely from the adsorbent and of reactivating the adsorbent for further use by means of properly chosen liquid desorbing agents. Thus the present process likewise permits reactivation of the adsorbent without heating and substantially eliminates heat-of-wetting effects.

In accordance with the present invention, aromatics are removed from a gas oil or lubricating oil charge stock by adsorption on silica gel or other adsorbents of similar nature and the retained aromatics are desorbed from the adsorbent by means of an organic primary liquid desorbing agent which meets certain requirements with regard to adsorbability, as hereinafter specified. Examples of primary desorbing agents are benzene and ethylene dichloride. For maximum reactivation of the adsorbent, this primary desorbing agent is, in turn, desorbed from the gel by means of a secondary desorbing agent of lower adsorbability. The secondary desorbing agent may be of the type specified in the aforesaid application, Serial No. 501,280, and may consist of paraffinic, naphthenic as well as olefin hydrocarbons which do not polymerize at ordinary temperature in the presence of adsorbents such as silica gel, e. g. low boiling hydrocarbons such as propane, butane, isobutane, pentane, isopentane, cyclopentane, hexanes or the like or mixtures of such hydrocarbons as, for example, petroleum ether, and preferably is an aliphatic or saturated cyclic hydrocarbon or a mixture of such hydrocarbons. Low boiling hydrocarbons are preferable since there appears to be some improvement in desorbing capacity as molecular weight of the desorbing agent decreases although the use of hydrocarbons of the aforementioned types boiling in or above the boiling range of the aromatics in question are not excluded from the scope of the invention. In case it is desired to prepare products which are aromatic-free or substantially so, use of the two desorbing agents in consecutive order is required. However, if it is desired merely to reduce the aromatic content of the charge in order to produce a moderately refined oil, the gel after treatment with the primary desorbing agent is in a sufficiently reactivated state for this purpose so that the step of removing the first desorbing agent by means of the second may be omitted, provided the adsorption step is carried out under certain operating conditions as hereinafter specified.

We have found that in order not to require an excessive amount of desorbing agent in removing the high boiling aromatics substantially completely from the adsorbent, it is necessary that the primary desorbing agent be more strongly adsorbed, as defined below, by the adsorbent than are the aromatics. We have also found that, even though the secondary desorbing agent is incapable of effecting substantial desorption of the aromatics unless an excessive amount is used and although the primary desorbing agent is more strongly adsorbed than the aromatics in the particular sense hereinafter specified, nevertheless the primary agent, if properly chosen, may be displaced by a reasonable amount of the secondary agent. However, this can be achieved only if the difference in adsorbabilities of the two agents is not too great. Thus, the adsorbability of the primary agent should lie within a rather specific range, being sufficiently high to be effective in displacing the aromatics but not so high as to require excessive amounts of the secondary agent for its own displacement. Numerous organic liquids meet these requirements and therefore may be used as the primary desorbing agent. Methods have been devised for ascertaining the adsorbabilities of a solvent in order to determine its suitability for this purpose, and these methods are utilized in specifying the primary desorbing agent in accordance with the invention.

The ability of a primary desorbing agent satisfactorily to desorb the aromatics is ascertained from the adsorption isotherm of the aromatics and solvent in binary mixture. An adsorption isotherm is the relationship between composition of a solution and the amount of a component adsorbed by a given mass of adsorbent in equilibrium with the solution at constant temperature, and methods for its determination are well known to the art. For convenience, the apparent amount of a component adsorbed (as further discussed in connection with "adsorption index") rather than the actual amount is utilized in determining the adsorption isotherm. For a liquid to be suitable as the primary desorbing agent, we have found, as stated above, that it should be more strongly adsorbed than the aromatics, by which is meant that it will be preferentially adsorbed from binary solution with the aromatics over at least a major portion of the concentration range as indicated by the adsorption isotherm. This does not imply that the primary desorbing agent need be preferentially adsorbed at all concentrations. By way of illustration, Fig. 1 of the accompanying drawings shows adsorption isotherms for benzene in binary solution with lubricating oil aromatics with a silica gel adsorbent at room temperature. Two curves are shown corresponding to two different fractions of aromatics used, namely, fraction A which was the most highly aromatic material derived from a lubricating oil stock (i. e., it contained the largest proportion of aromatic rings per molecule) and fraction B which was derived from the same stock but was less aromatic. It may be seen that with fraction A, the type of curve commonly called an S-shaped curve was obtained, showing that neither benzene nor the aromatics were preferentially adsorbed over the whole concentration range. However, fraction A was preferentially adsorbed only when its concentration was below about 11 per cent whereas benzene was preferentially adsorbed throughout the remainder of the concentration range. Therefore, for the present purpose, it may be said that benzene is more strongly adsorbed than the aromatics represented by fraction A and thus that it is suitable for displacing such aromatics from the adsorbent. As further shown in Fig. 1, a so-called U-shaped curve was obtained with fraction B, indicating that benzene was preferentially adsorbed throughout the whole concentration range with these aromatics and therefore that the latter may be displaced with still smaller proportions of benzene than required by fraction A. Any desorbing liquid which, in solution with the aromatics it is to displace, is preferentially adsorbed throughout more than 50 per cent of the concentration range is capable of desorbing such aromatics substantially completely, without unreasonably large proportions of the liquid being required. For indicating the suitability of a given liquid as the primary desorbing agent, the adsorption isotherm should be determined at substantially the same temperature as used in actual operation, which preferably is room temperature or ordinary storage tank temperatures.

The second requirement for a satisfactory primary desorbing agent is that it be capable of being displaced from the adsorbent by reasonable amounts of the secondary desorbing agent. This characteristic is determined according to the present invention by means of an arbitrary factor termed the "adsorption index." We have found that organic liquids which have an "adsorption index" not greater than about 40 meet this requirement. Liquids which have an adsorption index of about 8–20 give best results and therefore are preferred.

As used herein in both the description and claims, the "adsorption index" of a compound may be defined as the apparent number of cubic centimeters of the compound adsorbed by one kilogram of the adsorbent when the latter is in equilibrium with a solution consisting of the compound and the secondary desorbing agent employed in the process, which solution contains 0.2 per cent of said compound by volume. For example, if benzene is under consideration as the primary desorbing agent and pentane is to be used as the secondary desorbing agent, then the "adsorption index" of benzene is the apparent number of cubic centimers of benzene adsorbed by one kilogram of the adsorbent in equilibrium with a solution consisting of 0.2 per cent benzene and 99.8 per cent pentane by volume. The "adsorption index" thus is a measure of the adsorbability of the primary desorbing agent from solution with the secondary agent, and, since adsorption is an equilibrium phenomenon, therefore is also a measure of the ease with which the primary agent may be displaced from the adsorbent by means of the secondary agent. The low concentration of 0.2 per cent primary agent was chosen for specifying this index since the amount of secondary agent required to effect removal of the first is related more to the ease of desorption at low concentrations of primary agent than at high concentrations.

It will be evident from the above definition that the "adsorption index" is the ordinate value corresponding to an abscissa value of 0.2 per cent primary liquid on the adsorption isotherm for a binary mixture of primary and secondary liquids. A convenient method of determining "adsorption index" comprises first obtaining several points on the adsorption isotherm at low concentrations of the primary agent, preferably at concentrations below about 5 per cent. This may be done by contacting a measured volume of binary mixture of known concentration with a given weight of adsorbent and determining the concentration of the solution after equilibrium has been established. This procedure is carried out several times while varying the equilibrium concentration within the range below 5 per cent primary component, and in each case the amount of the component adsorbed is calculated from the original and final concentrations. In utilizing this method for determining "adsorption index," adsorption of the secondary solvent and change in volume due to adsorption of the primary solvent are neglected, so that the calculated amount of primary solvent adsorbed is an apparent amount rather than the actual amount. (In determining complete adsorption isotherms as shown in Fig. 1, a similar method also utilizing the apparent rather than actual adsorption is employed.) The "adsorption index" then may be obtained, without an actual determination at a concentration of 0.2 per cent, by plotting the experimental data and extrapolating or interpolating to a concentration of 0.2 per cent. Alternatively, since in dilute solution the adsorption isotherm relationship is expressed with reasonable accuracy by the well-known equation of the Freundlich type:

$$\frac{V}{M} = KC^N$$

in which V is the volume of primary component adsorbed, M is the weight of adsorbent, C is the equilibrium concentration and K and N are constants, this equation may be used to calculate the "adsorption index." This is done by solving for the constants K and N from the known experimental data and then using these constants in the equation to calculate the value of V when M equals one kilogram and C equals 0.2 per cent by volume. The "adsorption index" should be determined at substantially the same temperature as used in the process step of desorbing the primary agent by means of the secondary agent, which preferably is ordinary temperature.

Figure 2:
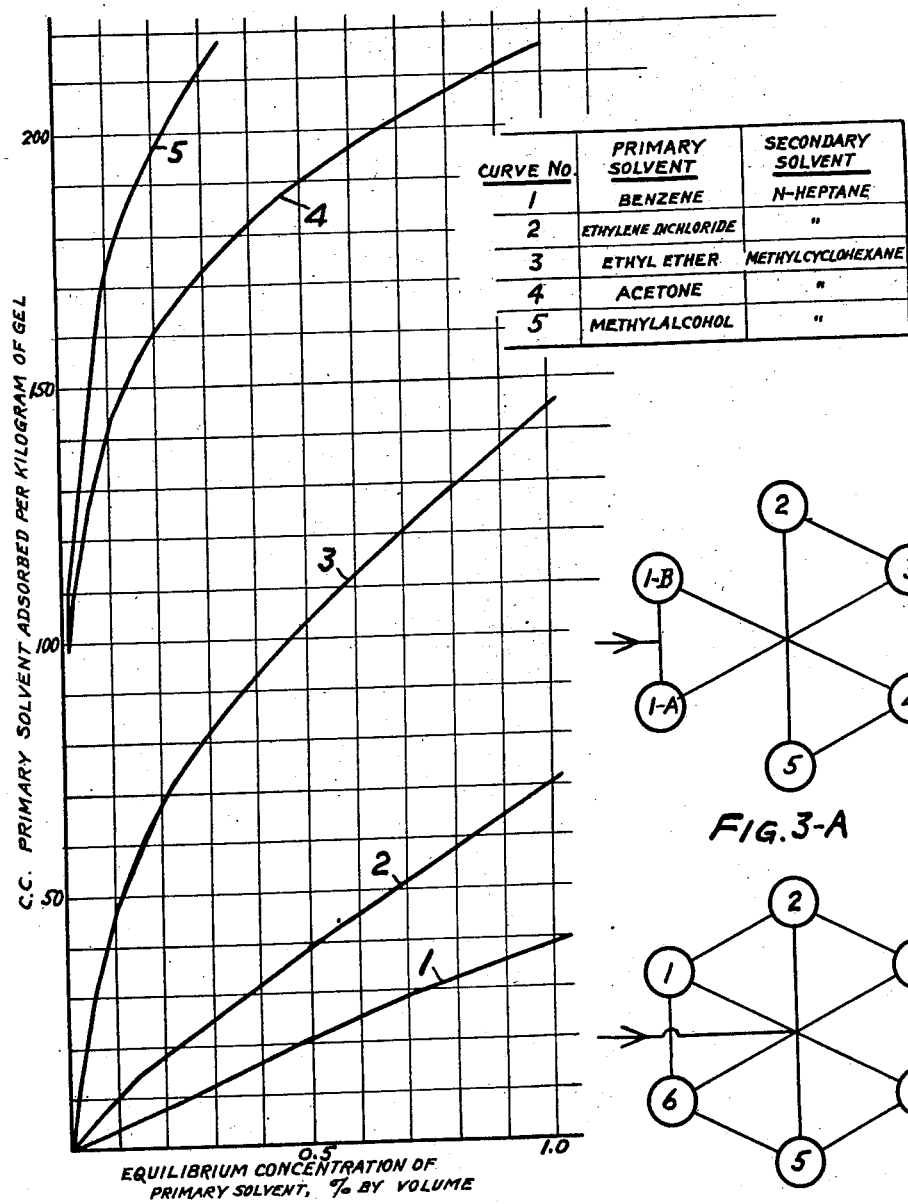

In Fig. 2 of the accompanying drawings, adsorption isotherms obtained in the above described manner for several mixtures of primary and secondary liquids at room temperature with silica gel as the adsorbent are shown. In the following tabulation are listed "adsorption indexes" obtained from the curves of Fig. 2. "Adsorption indexes" for methylcyclohexane in n-heptane and carbon tetrachloride in n-heptane are also listed:

| Primary Liquid | Secondary Liquid | Adsorption Index of Primary Liquid |
|---|---|---|
| methylcyclohexane | n-heptane | 0.2 |
| carbon tetrachloride | do | 0.8 |
| benzene | do | 8 |
| ethylene dichloride | do | 18 |
| ethyl ether | methylcyclohexane | 68 |
| acetone | do | 160 |
| methyl alcohol | do | 196 |

Since an adsorption index of zero indicates that there is no difference in the adsorbabilities of the primary and secondary components, it is evident that the difference in adsorbabilities of naphthenes, as exemplified by methylcyclohexane, and paraffins, as exemplified by n-heptane, is negligible insofar as the present process is concerned. Either of these is a good example of a secondary desorbing agent. Since these types of hydrocarbons are not preferentially adsorbed from solution with aromatics at any concentration, they are not suitable as primary agents. Monoolefinic hydrocarbons behave similarly to naphthenic or paraffinic hydrocarbons as far as the present invention is concerned.

Benzene, with an "adsorption index" of 8 and being more strongly adsorbed than high boiling aromatics as shown in Fig. 1 and discussed above, is a satisfactory primary desorbent. Toluene and xylene likewise meet the requirements, although their "adsorption indexes" are slightly lower than that for benzene and therefore are below the preferred range of 8–20. Other benzene derivatives also may be used as the primary agent.

Ethylene dichloride, which has an index of 18 and which is more strongly adsorbed than high boiling aromatics according to the definition set forth above, is an excellent primary agent. Ethyl chloride likewise is suitable. Many other halogenated hydrocarbons, including iodine, bromine and fluorine derivatives, meet the requirements. Carbon tetrachloride, however, is not as strongly adsorbed as the high boiling aromatics and therefore is not a satisfactory displacing agent therefor. In fact, this compound is sufficiently poorly adsorbed that for the present purpose it is substantially equivalent to saturated hydrocarbons and may be used as the secondary desorbing agent. Other organic liquids which are substantially equivalent to saturated hydrocarbons in adsorbability also may be employed as the secondary desorbent. For the present purpose it may be considered that any organic liquid which, in binary solution with a relatively low boiling saturated hydrocarbon (for example, pentane), has an "adsorption index" less than about 2 is substantially equivalent to saturated hydrocarbons and may be used as the secondary desorbing liquid.

Various oxy-hydrocarbons which are not too highly polar also may meet the specifications for a satisfactory primary desorbent. However, as shown in the above tabulation, ethyl ether has an "adsorption index" somewhat too high and requires unreasonably large amounts of the secondary agent to effect its desorption. Acetone and methyl alcohol have such high indexes that, for practical purposes, it may be said that their removal cannot be effected by means of the secondary desorbent.

One manner of practicing the invention comprises treating the charge stock with silica gel to adsorb aromatics, preferably by percolating the charge stock through the gel in a filtration zone, passing the primary desorbing liquid through the gel in sufficient amount to desorb the aromatics, and then passing sufficient secondary desorbing liquid through the gel to bring its activity back to the desired value by desorption of the primary agent. The effluent from the filtration zone is segregated into desired fractions, and the desorbents are separated and recovered from the fractions by distillation or any other suitable means. By proper segregation of the effluent stream, products varying widely in properties and ranging from non-aromatic to highly aromatic materials may be obtained. The refractive index of the efflux serves as a convenient means of determining when properly to cut between the fractions.

In a preferred mode of operation, however, the invention includes several distinctive features which are highly advantageous. One of these comprises diluting the charge stock with secondary desorbing agent, this preferably being a relatively low boiling saturated hydrocarbon material such as pentane, and passing the solution rather than undiluted charge stock to the filter. Such dilution is not merely for the obvious purpose of facilitating filtration by reducing viscosity of the charge. In addition to this advantage, we have found that dilution with certain proportions of the material used as secondary desorbing liquid, or another solvent of the same type, improves the efficiency of adsorbing aromatics from the charge. It appears that the non-aromatic hydrocarbons of the charge stock have a high solvency effect on the aromatics, rendering them more difficultly adsorbed from solution, whereas the pentane (or its equivalent), although being completely miscible with the aromatics, may be said to be a poorer solvent therefor, such as might be judged by differences in internal pressures or deviations from the laws of ideal solution. Dilution with pentane or the like thus has a tendency to render the charge stock aromatics more easily adsorbed. However, such dilution decreases the concentration of aromatics in the charge and, in this respect, tends to have the opposite effect. Therefore, there is a limit to the degree of dilution for increasing the efficiency of adsorption. With usual charge stocks, this limit appears to be at a ratio roughly in the neighborhood of three volumes of the liquid of secondary desorbing agent type to one volume of charge stock. A ratio of at least 0.5:1 is desirable, and a ratio of about 1.5:1 appears best considering effectiveness in rendering the aromatics easily adsorbed and cost of recovering the diluent.

As previously stated, the invention in one form may be practiced for the purpose of reducing the aromatic content of a charge stock rather than of producing a substantially aromatic-free product, by omitting the step of desorbing the primary agent with the secondary agent. In such case, however, it is distinctly preferable that the charge stock be diluted with pentane or the like as described above. We have found that gel containing adsorbed primary agent is sufficiently active to effect substantial removal of aromatics provided the charge stock is properly diluted with secondary liquid, but that the gel is too inactive to accomplish this in a practical manner if the dilution is omitted.

As another feature of the invention, a step, wherein the adsorbent is washed with secondary liquid, is introduced to follow the adsorption step. This serves to remove the charge hold-up from the interstices of the adsorbent; furthermore, since the secondary desorbing liquid is ineffective to remove the adsorbed aromatics but is capable of desorbing non-aromatics present in the adsorbate, this step also serves to separate adsorbed non-aromatics from the aromatics, thereby resulting in a more complete separation of the charge into aromatic and non-aromatic components.

For an adsorption process employing an expensive adsorbent such as silica gel to be commercially successful, it is necessary that the gel be capable of use through many cycles of operation due to the large cost of replacement. In treating petroleum oils according to the present invention it has been found that the gel gradually loses its adsorptive capacity due to the circumstance that the charge stock contains a small amount of material which is very strongly adsorbed by the gel and which is only partially removed by the primary desorbing agent. On continued use, the gel gradually accumulates a black, viscous, highly aromatic odorous material containing about 1 per cent sulfur and 1 per cent nitrogen, and its activity eventually drops to an uneconomic level, necessitating regeneration of a more severe type to effect removal of this material and bring the gel activity back to the desired value. This more severe regeneration may be accomplished by passing through the gel a desorbing agent which is very strongly adsorbed, for example, methanol or acetone, and then by blowing the gel at an elevated temperature, suitably 150–180° C., with air until the adsorbed desorbent is removed.

A further feature of the invention and one of distinct advantage in maintaining activity of the adsorbent, thereby reducing the frequency with which the aforesaid severe regeneration is required, comprises the use of a multiplicity of filtration zones or sections, and, during each cycle of operation, regenerating the adsorbent in each zone separately. A desirable number of zones to use is three, although any reasonable multiple number would be advantageous as compared to only a single section. Charge stock is passed in series flow through the several zones; thus, as far as the adsorption step is concerned, this manner of operation is not essentially different from using a single zone. The aforementioned washing step to remove hold-up and non-aromatics likewise is carried out with the wash liquid (secondary desorbent type) flowing through the zones in series. However, parallel flow is used in the two other steps of the cycle. Thus, fresh primary desorbing liquid is sent to and withdrawn from each zone separately to desorb the aromatics therefrom. Likewise, fresh secondary agent is percolated through each zone to desorb the primary liquid in the same fashion. This manner of operation is a decided improvement in several respects. Of the aromatic hydrocarbons adsorbed from the charge stock, the most highly aromatic (i. e., those containing the largest proportion of aromatic rings per molecule) are retained in the first section, those retained in the second section are less aromatic, those in the third section are of still lower aromaticity, etc. Separate regeneration of each section thus permits the production of fractions of different aromaticities. Furthermore, considerably less primary desorbing agent is required to remove these fractions from each zone than would be the case if all fractions were washed through each succeeding zone, as occurs in series flow desorption. In the step of desorbing the primary liquid by means of the secondary liquid, this manner of operation permits the desorption to be carried out in less time. Of possibly still more importance is the fact that the overall activity of the gel as a whole is maintained at a high value for a considerably longer period of cyclic operation than when series flow is used. This is due to the circumstance that the aforementioned very strongly adsorbed material, which during desorption is retained preponderantly in the first zone and which is partially removable by the primary desorbent, is not washed into the succeeding zones and therefore does not have the opportunity to affect the activity of adsorbent in these zones. Thus, the activity of adsorbent in the first zone may drop to an uneconomic level after 50–100 cycles of operation, whereas adsorbent in the second or third zone may be sufficiently active throughout 200–400 cycles. Accordingly, adsorbent in the first zone requires severe regeneration more frequently than that in the other zones. The present feature permits occasional complete revivification of that portion of total adsorbent requiring it, without necessity for subjecting all of the adsorbent to severe regeneration, and, at the same time, appreciably reduces the time required in each cycle for regeneration by the desorbing liquids.

In practicing the invention with a plurality of filtration zones as described above, a series of filter drums or columns, or one column divided into the desired number of vertical sections, may be utilized. Figs. 3—A and 3—B in the accompanying drawings illustrate two suitable arrangements of apparatus, each figure showing six filters by way of illustration although a larger or smaller number of filters could be employed in similar fashion. For simplicity, all the flow lines which would be required in actual practice are not shown; for example, flow lines for carrying out the desorption steps are omitted, it being understood that desorption preferably is carried out for each filter separately as described above. For purpose of illustration, it is assumed that three filter zones are necessary to effect the desired adsorption and that severe regeneration is required in the first zone after 50 cycles. In Fig. 3—A, charge is first passed through filters 1—a, 2 and 3 during the adsorption step of each cycle for 50 cycles. Then it is sent through filters 1—b, 2 and 3 for 50 more cycles, during which period the adsorbent in 1—a is subjected to severe regeneration. During the next 50 cycles, charge again is passed through 1—a, 2 and 3, and 1—b is subjected to severe regeneration. Filters 1—a and 1—b are used alternately in this manner as the first filtration zone throughout the operation. After say 200 cycles, the use of filter 2 is discontinued, the charge being passed alternately through 1—a, 3 and 4 and 1—b, 3 and 4, and filter 2 is subjected to severe regeneration. After 200 more cycles, for example, the flow is directed alternately through 1—a, 4 and 5 and 1—b, 4 and 5 and the adsorbent in filter 3 is fully revivified; thereafter through 1—a, 5 and 2 and 1—b, 5 and 2; then 1—a, 2 and 3 and 1—b, 2 and 3; etc. In the arrangement shown in Fig. 3—B, charge is first passed through 1, 2 and 3 for 50 cycles; then through 2, 3 and 4 for the next 50 cycles; 3, 4 and 5; 4, 5 and 6; 5, 6 and 1; etc. As the use of each filter is discontinued, the adsorbent therein is completely regenerated. With decline in adsorbent activity, it may prove advantageous to employ four or more filters in series rather than three. These methods of operation permit maintenance of economic activity throughout prolonged operation with a minimum of severe regeneration.

The following examples are illustrative although not necessarily limitative of the invention:

*Example I*

A filter column divided into top, middle and bottom filtration sections and containing 100 grams of 28–200 mesh silica gel in each section was utilized in a prolonged cyclic operation. In each cycle 100 grams (108 ml.) of a lubricating oil distillate derived from a naphthenic base crude and having the properties tabulated below was diluted with 100 grams (160 ml.) of pentane and the mixture was percolated by gravity flow in series through the three sections. After the charge mixture had passed through the column, hold-up was removed by passing 50 ml. of petroleum ether through the three sections in series, followed by an additional 25 ml. of petroleum ether passed in series through the middle and bottom sections only. Adsorbate fractions then were desorbed from the sections separately by percolating benzene in parallel flow through each section, 250 ml. of benzene being used in the top section and 200 ml. in each of the two lower sections. Desorption of benzene likewise was carried out in each section separately by percolating 200 ml. of petroleum ether in parallel flow through the several sections. The gel was then used in a new cycle of operation. This procedure was followed in each cycle.

At intervals throughout the prolonged operation, activities of the gel in each section were determined following regeneration with the secondary desorbing agent. As a measure of activity, the ratio of the decrease in refractive index of a standard oil on passing through the used gel to the refractive index decrease for the same oil on passing through the original unused gel was utilized, the activity being expressed as follows:

Percent activity =

$$\frac{\text{Refractive index decrease}}{\text{Refractive index decrease with original gel}} \times 100$$

Standard oils and procedure were employed in making these activity tests, the oil used for testing each section being so selected that its aromatic content approximated that of the oil entering the same section during actual operation.

Several times during the prolonged cyclic operation, gel in the top section of the column, after its activity had dropped to an undesirably low level, was subjected to a more severe, although incomplete, regeneration to improve its activity, after which cyclic operation was resumed. After 257 cycles of operation, the gel in all sections was substantially completely regenerated by washing with methanol and then blowing with hot air. At no other time during the prolonged operation was gel in the middle or bottom sections subjected to regeneration other than the reactivation by means of liquid desorbing agents in accordance with the invention.

Pertinent data, including yields and properties of the filtrate and activities of the gel corresponding to various cycles during the operation, are given in the following tabulation:

|  |  | Cycle No. 1 | Cycle No. 9 | Cycle No. 257 | Cycle No. 258 |
|---|---|---|---|---|---|
| Yield of filtrate, per cent of charge |  | 49 | 53 | 62 | 56 |
| Properties of filtrate | (Charge) |  |  |  |  |
| Kinematic visc. at 100° F., centistokes | 104.3 | 54.71 | 58.59 |  |  |
| Kinematic visc. at 210° F., centistokes | 7.79 | 6.38 | 6.53 |  |  |
| Viscosity Index | 0 | 60 | 54 |  |  |
| Refractive Index, 20° C./D | 1.5155 | 1.4849 | 1.4867 | 1.4910 | 1.4863 |
| Density, 20° C./4° C | 0.930 | .8891 | .8936 |  |  |
| Aniline Point, °C | 73.4 |  |  |  |  |
| Molecular Weight | 354 | 383 | 382 |  |  |
| Wt. per cent Aromatic Rings | 17 |  |  |  |  |
| Gel activity at beginning of cycle: |  |  |  |  |  |
| For top section [2] |  | 100 | 78 | 61 | [1] 98 |
| For middle section |  | 100 | 92 | 72 | [1] 100 |
| For bottom section |  | 100 | 99 | 83 | [1] 98 |

[1] Gel substantially fully regenerated by washing with methanol and blowing with hot air after cycle No. 257.
[2] Gel in the top section only was partially regenerated as follows:

|  | Activity before partial regeneration | Activity after partial regeneration |
|---|---|---|
|  | Per cent | Per cent |
| After Cycle No. 31 |  | 81 |
| After Cycle No. 84 | 64 | 77 |
| After Cycle No. 152 | 52 | 82 |
| After Cycle No. 211 | 46 | 72 |

The tabulated data show that efficient operation in accordance with the invention may be practiced with a given batch of adsorbent over a very extended period.

The aromatic fractions obtained throughout cycles 2–8 were composited for each section and the following test data were obtained on each composite:

|  | Aromatics composited from cycles 2–8 | | |
|---|---|---|---|
|  | Top Section | Middle Section | Bottom Section |
| Kinematic visc. at 100° F., centistokes | 308.6 | 332.2 | 217.7 |
| Kinematic visc. at 210° F., centistokes | 9.74 | 12.92 | 10.48 |
| Viscosity Index | −221 | −63 | −51 |
| Refractive Index, 20° C./D | 1.5725 | 1.5542 | 1.5271 |
| Density, 20° C./4° C | 1.0066 | 0.9880 | 0.9526 |
| Aniline Point, °C |  | 24.4 | 51.7 |
| Molecular Weight | 307 | 368 | 354 |
| Wt. per cent Aromatic Rings |  | 66 | 39 |

These data indicate that the aromatics themselves are fractionated in the operation according to degree of aromaticity.

*Example II*

The present example was carried out with substantially the same operating conditions as in Example I. Charge stock from the same source was used but the charge stock in this case had been treated with 20 lbs. of concentrated sulfuric acid per bbl. of oil. The following tabulation shows data similar to those listed in the previous examples:

|  | Cycle No. 1 | Cycle No. 12 | Cycle No. 50 | Cycle No. 96 | Cycle No. 247 | Cycle No. 249 |
|---|---|---|---|---|---|---|
| Yield of filtrate, per cent of charge |  | 48 | 57 | 64 | 66 | 64 | 55 |
| Properties of filtrate | (Chg.) |  |  |  |  |  |
| Kinematic visc. at 100° F., centistokes | 99.6 | 55.44 | 58.98 |  |  |  |
| Kinematic visc. at 210° F., centistokes | 7.79 | 6.41 | 6.58 |  |  |  |
| Viscosity Index | 10 | 59 | 56 |  |  |  |
| Refractive Index 20° C./D | 1.5117 | 1.4845 | 1.4865 | 1.4900 | 1.4907 | 1.4920 | 1.4865 |
| Density, 20° C./4° C | .9282 | .8900 | .8927 |  |  |  |
| Aniline Point, °C | 77.40 | 99.6 | 97.9 |  |  |  |
| Molecular Wt | 364 | 384 | 382 |  |  |  |
| Wt. per cent Aromatic Rings | 16 | 0 | 2.2 |  |  |  |
| Gel activity at beginning of cycle: |  |  |  |  |  |  |
| For top section [2] |  | 100 | 79 | 58 | 49 | 51 | [1] 90 |
| For middle section |  | 100 | 95 | 82 | 73 | 62 | [1] 99 |
| For bottom section |  | 100 | 97 | 88 | 83 | 72 | [1] 96 |

[1] Gel substantially fully regenerated by washing with methanol and blowing with hot air after cycle No. 248.
[2] Gel in the top section only was partially regenerated as follows:

|  | Activity before partial regeneration | Activity after partial regeneration |
|---|---|---|
|  | Per cent | Per cent |
| After Cycle No. 96 | 58 | 71 |
| After Cycle No. 162 | 39 | 63 |
| After Cycle No. 221 | 37 | 62 |

The aromatic fractions obtained throughout cycles 1–9 were composited for each section and the following test data were obtained on each composite:

|  | Aromatics composited from cycles 1-9 | | |
|---|---|---|---|
|  | Top Section | Middle Section | Bottom Section |
| Kinematic visc. at 100° F., centistokes | 323.8 | 231.6 | 278.7 |
| Kinematic visc. at 210° F., centistokes | 10.00 | 11.35 | 11.16 |
| Viscosity Index | −220 | −30 | −89 |
| Refractive Index, 20° C./D | 1.5677 | 1.5501 | 1.5288 |
| Density, 20° C./4° C | 1.0005 | 0.9844 | 0.9551 |
| Aniline Point, °C |  | 24.4 | 49.8 |
| Molecular Weight | 309 | 371 | 348 |
| Wt. per cent Aromatic Rings |  | 66 | 40 |

*Example III*

The present example illustrates the effect of diluting the charge stock with solvent of the secondary type in order to facilitate adsorption of the aromatics. Several runs were made, in each of which 100 grams of the same charge stock as used in Example I (refractive index=1.5155) was diluted with pentane and the mixture was percolated through a column containing 100 grams of silica gel in activated condition. A different amount of pentane was used in each run in order to show the effect of pentane: charge stock ratio. The total filtrate in each run after pentane had been removed was tested for refractive index, with results as follows:

| Dilution Ratio (Vol. of pentane per vol. of charge stock) | Refractive index of diluent-free filtrate |
|---|---|
| 0.46 | 1.5013 |
| 0.93 | 1.4990 |
| 1.48 | 1.4980 |
| 2.77 | 1.4978 |
| 4.63 | 1.4985 |
| 6.93 | 1.5000 |

These results indicate that the maximum adsorption of aromatics is obtained at a dilution ratio within the approximate range of 1.5:1 to 3:1, and that above or below these limits, appreciably less aromatics are adsorbed. The filtrate became considerably lighter in color as the dilution ratio was increased up to 2.77. Further dilution caused substantially no improvement in color. A ratio of about 1.5:1 is indicated as preferable, taking into account requirements for recovery of diluent. For charge stocks which are substantially different from that used in the present example, the optimum dilution ratio may be different.

The present invention is not necessarily limited to the use of silica gel as the specific adsorbent, since other adsorbents conforming substantially to silica gel in adsorptive properties also may be utilized. The adsorbent should have a high selectivity for aromatic hydrocarbons and should be capable of reactivation in accordance with the invention. Various activated clays, for example, alumina or bauxite, although being less efficient than silica gel, meet these requirements satisfactorily. When the above-described multiple section operation is used, it may be advantageous in some instances to use in the first section a cheaper and less effective adsorbent and employ a more effective adsorbent such as silica gel only in the other filtration zones. This permits adsorbent in the first zone, whenever its activity has declined to an uneconomic value, to be discarded. This may prove more economical than subjecting all of the adsorbent to the occasional severe regeneration. The primary desorbing agents suitable for use with other adsorbents will, in general, be those employed with silica gel, although they will not necessarily be the same in all cases. In choosing a primary desorbing liquid for use with a specific adsorbent, it is only necessary to determine that the liquid in question meets the two requirements, specified above, of being more strongly adsorbed than the aromatics by the particular adsorbent used, as determined by the adsorption isotherm, and of having an "adsorption index" less than about 40. Even activated carbon, which is an organophilic adsorbent in contrast to silica gel which is hydrophilic, has been found to be capable of functioning in a manner substantially equivalent to silica gel provided the primary desorbing agent is chosen as specified.

In choosing desorbents for practicing the process, it is desirable that they be so selected with respect to boiling point that they may be easily separated from the products and from each other by distillation. The desorbing agents employed, of course, should have no tendency to react (e. g., polymerize) in the presence of the adsorbent under the operating conditions.

We claim:

1. A cyclic process for separating aromatic hydrocarbons from a mixture of hydrocarbons containing the same and boiling mainly above 500° F. which comprises treating said mixture with silica gel to adsorb aromatic hydrocarbons therefrom, washing the thus used adsorbent with an organic primary liquid desorbing agent having an adsorbability such that, from binary solution of said aromatics and said desorbing agent, the latter will be preferentially adsorbed by the adsorbent over a major portion of the concentration range and which is further characterized by an "adsorption index" not greater than about 40, thereby to displace aromatics from the adsorbent, and washing the adsorbent with a secondary desorbing agent comprising essentially a saturate hydrocarbon liquid adapted to effect desorption of the primary desorbing agent and to reactivate the adsorbent for re-use.

2. A cyclic process for separating aromatic hydrocarbons from a mixture of hydrocarbons containing the same and boiling mainly above 500° F. which comprises percolating said mixture through silica gel to adsorb aromatic hydrocarbons from said mixture, percolating through the thus used adsorbent an organic primary liquid desorbing agent having an adsorbability such that, from a binary solution of said aromatics and said desorbing agent, the latter will be preferentially adsorbed by the adsorbent over a major portion of the concentration range and which is further characterized by an "adsorption index" not greater than about 40, thereby to displace aromatics from the adsorbent, and then percolating through the adsorbent a secondary desorbing agent comprising essentially a saturate hydrocarbon liquid adapted to effect desorption of the primary desorbing agent and to reactivate the adsorbent for re-use.

3. The process defined in claim 2 wherein the charge stock is diluted with a saturate hydrocarbon liquid in amount effective substantially to improve the adsorbability of aromatics from the charge, and the resulting mixture is percolated through the adsorbent to effect adsorption of the aromatics in the manner specified.

4. A cyclic process for separating aromatic hydrocarbons from a charge stock containing the same and boiling mainly above 500° F. which comprises diluting the charge stock with a saturate hydrocarbon liquid, said liquid, being used in amount effective substantially to improve the adsorbability of aromatics from the charge, adsorbing aromatics from the resulting mixture by passing it in series flow through several filtration zones each of which contains silica gel, removing hold-up and adsorbed non-aromatics from the several zones by washing the adsorbent therein with a further quantity of saturate hydrocarbon liquid, removing adsorbed aromatics from each zone separately by passing in parallel flow through the several zones an organic primary liquid desorbing agent having an adsorbability such that, from a binary solution of the aromatics and said primary desorbing agent, the latter will be preferentially adsorbed by said adsorbent over a major portion of the concentration range and which is further characterized by an "adsorption index" not greater than about 40, and then removing adsorbed primary desorbing agent from each zone separately by passing in parallel flow through the several zones further quantities of saturate hydrocarbon liquid adapted as a secondary desorbing agent to desorb said primary desorbing agent from the adsorbent and to reactivate the adsorbent for re-use.

5. A cyclic process for reducing the aromatic content of a charge stock containing aromatic hydrocarbons and boiling mainly above 500° F. which comprises diluting the charge stock with a relatively low boiling solvent consisting essentially of pentane, said solvent being used in amount effective substantially to improve the adsorbability of aromatics from the charge, treating the resulting mixture with silica gel to adsorb aromatic hydrocarbons therefrom, and washing the thus used adsorbent with an organic liquid desorbing agent having an adsorbability such that, from binary solution of said aromatics and said desorbing agent, the latter will be preferentially adsorbed by the adsorbent over a major portion of the concentration range and which is further characterized by an "absorption index" not greater than about 40 in binary solution with pentane, thereby to displace aromatics from the adsorbent and reactivate the adsorbent for re-use.

6. A process for reducing the aromatic content of a charge stock containing aromatic hydrocarbons and boiling mainly above 500° F. which comprises a continual cyclic operation wherein in each cycle the charge stock is diluted with a saturate hydrocarbon liquid in amount effective substantially to improve the adsorbability of aromatics from the charge, the resulting mixture is contacted with silica gel to adsorb aromatic hydrocarbons therefrom, and the thus used adsorbent is contacted with an organic liquid desorbing agent having an adsorbability such that, from a binary solution of said aromatics and said desorbing agent, the latter will be preferentially adsorbed by the adsorbent over a major portion of the concentration range and which is further characterized by an "adsorption index" not greater than about 40 in binary solution with pentane, thereby to displace aromatics and reactivate the adsorbent for re-use.

7. The process defined in claim 2 wherein the primary desorbing agent is benzene and the secondary desorbing agent is a relatively low boiling saturate hydrocarbon material.

8. The process defined in claim 2 wherein the primary desorbing agent is ethylene dichloride and the secondary desorbing agent is a relatively low boiling saturate hydrocarbon material.

9. The process defined in claim 5 wherein the desorbing agent is benzene.

10. The process defined in claim 5 wherein the desorbing agent is ethylene dichloride.

11. The process defined in claim 6 wherein the desorbing agent is benzene.

12. The process defined in claim 6 wherein the desorbing agent is ethylene dichloride.

13. The process defined in claim 1 wherein the primary liquid desorbing agent is benzene.

14. The process defined in claim 1 wherein the primary liquid desorbing agent is ethylene dichloride.

ALFRED E. HIRSCHLER.
MOSES ROBERT LIPKIN.

(References on following page)

REFERENCES CITED

The following references are of record in the file of this patent:

UNITED STATES PATENTS

| Number | Name | Date |
|---|---|---|
| 1,678,298 | Patrick | July 24, 1928 |
| 1,868,581 | Miller | July 26, 1932 |
| 2,344,449 | Ogorzaly | Mar. 14, 1944 |
| 2,395,491 | Mavity | Feb. 26, 1946 |

OTHER REFERENCES

Mair et al., "Separation of Petroleum... Silica Gel," Oil and Gas Journal, Sept. 19, 1935, pages 29–32. (Copy in 196.147.)